March 20, 1962
E. M. DAVIS
3,026,516
ROTATABLE RADOME FOR AIRCRAFT
Filed Dec. 2, 1957
3 Sheets-Sheet 1
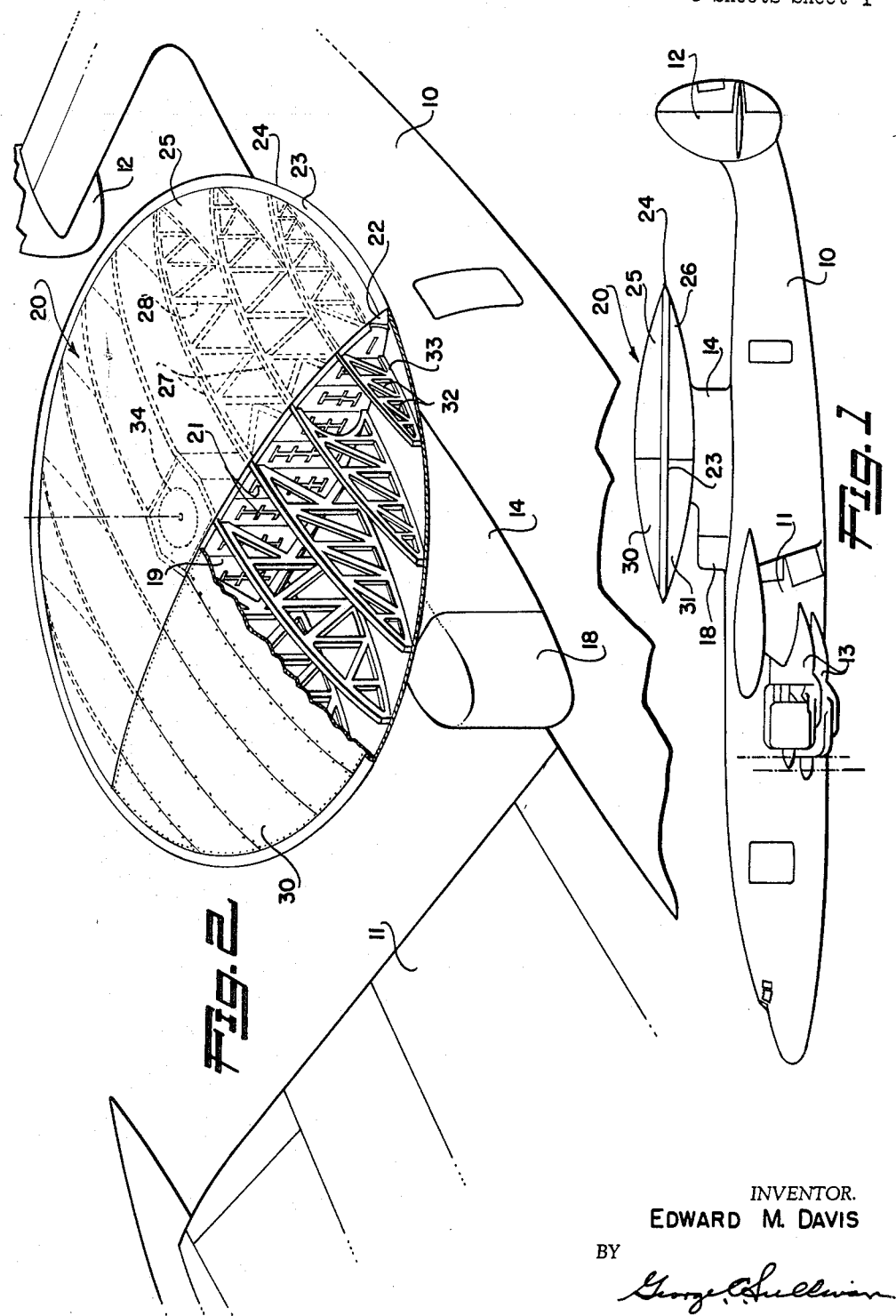
INVENTOR.
EDWARD M. DAVIS
BY
*George C. Sullivan*
Agent

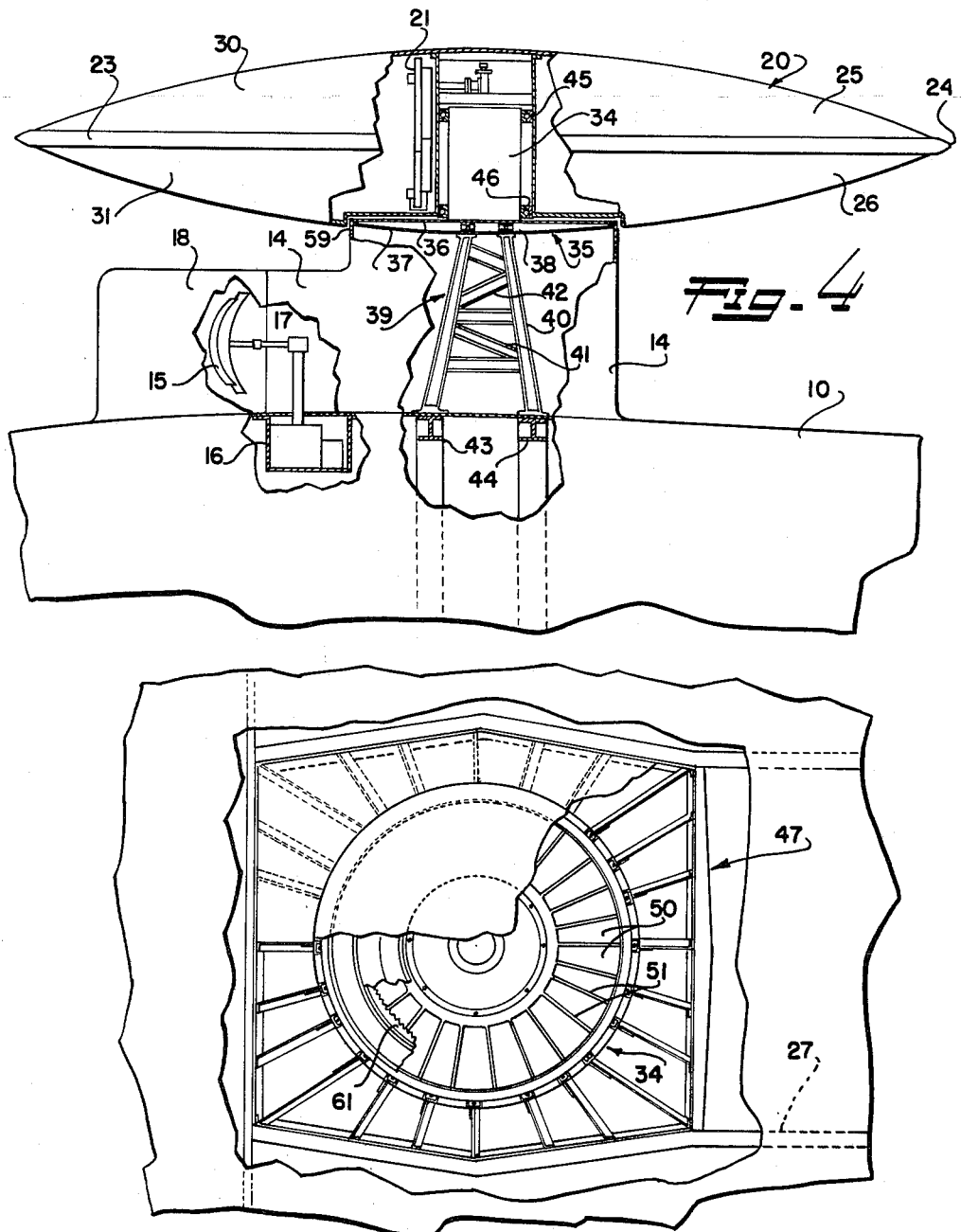

March 20, 1962 E. M. DAVIS 3,026,516
ROTATABLE RADOME FOR AIRCRAFT
Filed Dec. 2, 1957 3 Sheets-Sheet 3

INVENTOR.
EDWARD M. DAVIS
BY
George C. Sullivan
Agent

3,026,516
ROTATABLE RADOME FOR AIRCRAFT
Edward M. Davis, Sherman Oaks, Calif., assignor to Lockheed Aircraft Corporation, Burbank, Calif.
Filed Dec. 2, 1957, Ser. No. 699,989
7 Claims. (Cl. 343—705)

This invention relates to antenna installations and more particularly to the radar antenna of an airplane which is fixed to the radome and rotatable with the radome with respect to the airplane.

It has been the general practice in the aircraft field to enclose a radar antenna for an airplane in a radome, wherein the antenna itself is driven or rotated and the enclosing radome is held stationary to the airplane. In such arrangements, the radomes or at least substantial portions thereof, must be constructed of materials that are substantially "transparent" to the high frequency energy transmitted from the antenna and must be designed to permit free operation or movement of the antenna array within them. These and related considerations have made it difficult to construct radomes of adequate physical strength characteristics and have definitely tended to limit the size of the enclosed radiating elements, etc. that can be satisfactorily employed. For example, it has been found impractical in the past to mount on an airplane comparatively large radar antenna array suitable for operation at ultra high frequencies because of the apparent difficulty in providing a suitable enclosing radome for the same.

Consequently, more recent practice has employed an antenna installation system wherein the antenna is enclosed by a radome rotatably carried by the airplane so that the antenna and radome are maintained in a fixed rotatable relationship to the fuselage of the airplane. Such an antenna installation is disclosed in a copending application entitled "Rotatable Radomes for Aircraft" filed September 28, 1954 and assigned Serial No. 458,874. Even though the invention disclosed in this copending application obviates the above difficulties, the invention in this application requires that the radome be mounted on a rotating axle which extends through the pressurized cabin of the airplane. This arrangement necessitates a sealing means between the cabin and the radome. Also, the mechanism for driving the axle and the radome is mounted beneath the floor of the fuselage and thereby undesirable torque loads are placed on the axle. The use of an axle which projects through the fuselage of the airplane has been found to be undesirable since the axle obstructs the aisle through the cabin of the fuselage and creates a serious weight problem.

According to the present invention, a rotatable radome carrying a fixed antenna is provided on the fuselage of an airplane wherein the power driving unit is located within the radome itself and thereby eliminates the elongated axle which normally passes through the fuselage. A feature resides in the fact that the present invention provides suitable means for supporting a relatively large and heavy radome structure on the fuselage of an airplane so that vertical and horizontal loads encountered by the radome during normal flight are conveniently transferred through the mounting means into the structure of the fuselage per se.

Therefore, it is a general object of the present invention to provide a simple and effective antenna array-radome structure or combination, that overcomes the difficulties and limitations inherent in the fixed radome-moving antenna arrangements now in use in aircraft, or the difficulties encountered when employing a rotatable radome having an elongated axle extending through the pressurized cabin of an airplane.

Another object of the present invention is to provide an antenna array means of the character mentioned in which the radome presents a minimum frontal area and allows good streamlining for minimizing the drag penalty for a given antenna size. This feature makes it possible or practical to employ an antenna of large size for certain or specialized uses that could not be successfully enclosed in or protected by the conventional fixed type radomes. This minimizes the performance lost to the airplane on which it is installed.

Another object of the present invention is to provide a suitable mounting means for a rotatable radome on the fuselage of an airplane which can accommodate various horizontal and vertical loads placed thereon during flight of the airplane.

Still another object of the present invention is to provide a suitable mounting arrangement for a rotatable radome on an airplane having a pair of radar systems wherein one system is employed for horizontal searching and the other radar system employed for height finding purposes.

A further object of the present invention is to provide an airplane radome combination wherein a pair of radar systems are mounted in close proximity in which the location and shape of the radomes for both the radar systems do not detract to any appreciable extent from the stability, control or general handling characteristics of the airplane and wherein the radomes offer a minimum of aerodynamic drag. The arrangement or combination of the invention is such that a large antenna may be effectively employed with a minimum of drag penalty and without interfering with the stability of the airplane or its control characteristics.

Still a further object of the present invention is to provide a rotatable radome carrying a fixed antenna which is unpressurized and wherein the radome is rotatably mounted on the fuselage of an airplane which is of the pressurized cabin type without requiring a sealing means therebetween.

Other objects and features of the invention will become apparent from the following detailed description of a typical form of the invention wherein reference will be made to the accompanying drawings in which:

FIGURE 1 is a side elevational view of an airplane equipped or provided with the antenna-radome means of the present invention;

FIGURE 2 is a fragmentary perspective view of the airplane shown in FIGURE 1 wherein the radome covering is broken away to expose the interior thereof;

FIGURE 3 is an enlarged fragmentary plan view of the radome of the present invention illustrating the mounting for the rotatable radome on a fixed spindle;

FIGURE 4 is a fragmentary view of the radome broken away to illustrate internal supporting structure;

Figures 5, 6:
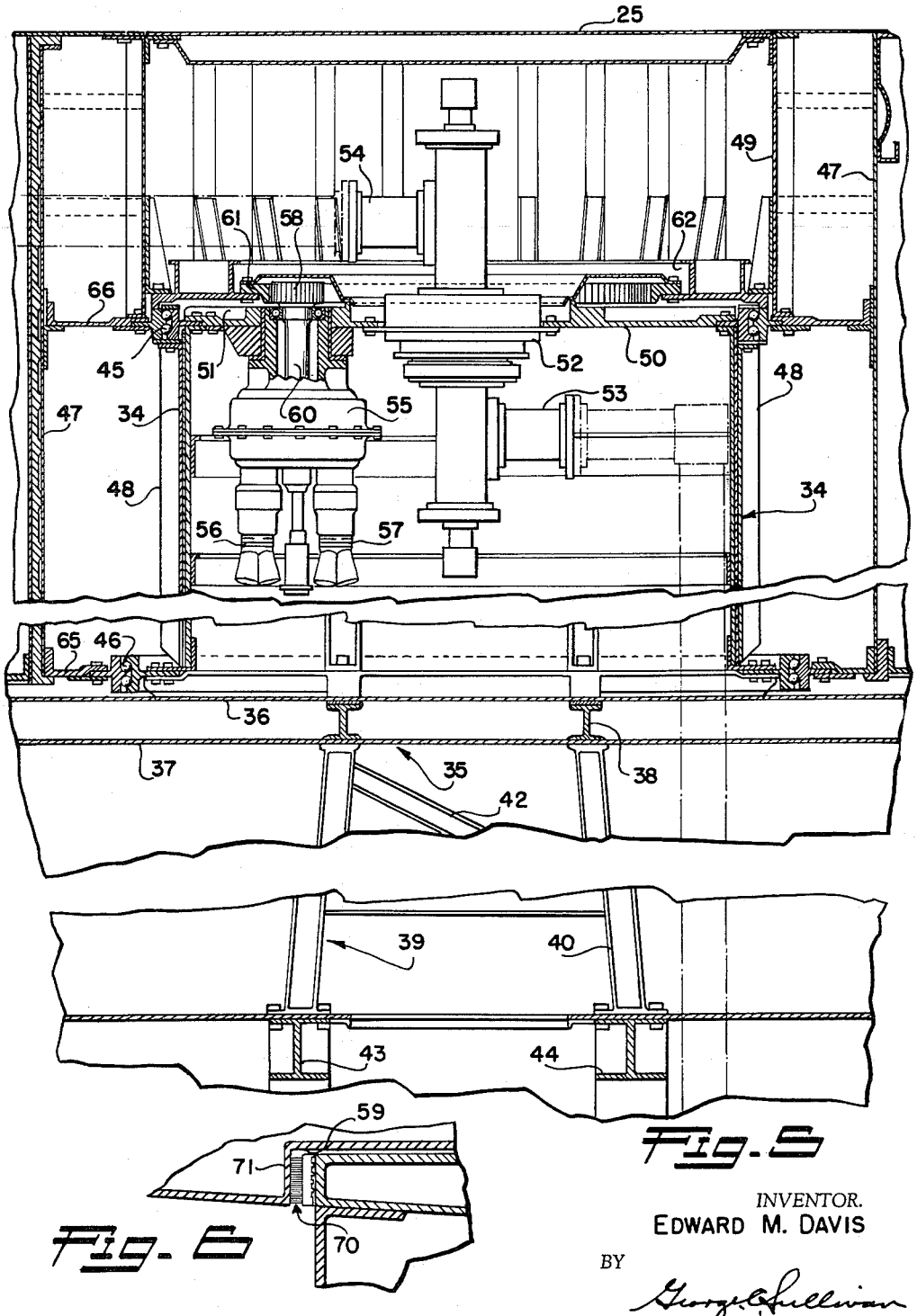
FIGURE 5 is an enlarged vertical detailed sectional view showing the radome mounting, rotating drive means and associated equipment.
FIGURE 6 is an enlarged sectional view showing an aerodynamic seal means communicating the rotatable radome with a fixed supporting pylon structure.

The antenna-radome of the present invention may, of course, be applied to or used in connection with aircraft of different types designed for various classes of service and the antenna-radome means may be modified in size, shape, location, etc. adaptable for given aircraft and/or for given intended fields of use. Accordingly, it is understood that the particular airplane illustrated in the drawings and the particular configuration, location, etc. of the antenna-radome shown are not necessarily restrictive, but are primarily typical and illustrative.

The airplane shown in FIGURES 1 and 2 includes a fuselage 10, wings 11, empennage 12 and engine nacelles 13 carried by the wings 11. In accordance with the invention, a pylon 14 extends upward from the fuselage 10 a short distance aft of the roots of the wings 11. The pedestal or pylon 14 is streamlined to offer a minimum of drag and is hollow and substantially faired into the fuselage 10 at its lower end.

Pylon 14 serves to enclose and protect a wave radiator or antenna 15 as shown in FIGURE 4. Antenna 15 is suitably supported by structure 16 secured to the fuselage 10 and is employed as a "height" finding radar system. The antenna 15 oscillates about a shaft 17 in a vertical direction so that an electro magnetic wave is radiated therefrom in a vertical direction. Simultaneously, antenna 15 is rotated. The forward portion of pylon 14 is constructed of a suitable material 18 transparent to the radiated energy from antenna 15 such as a fibre glass composition for example.

Rotatably mounted above pylon 14 is a radome 20 which serves to enclose and protect an electro magnetic wave generator-antenna 21, shown in FIGURE 2, and in accordance with the invention the radome is moveable or rotatable in unison with the antenna 21.

As seen more clearly in FIGURE 2, antenna 21 is of the conventional foil type which is suitably secured to a backing member 19 supported on a ground member 22. Inasmuch as antenna 21 is of the foil type, antenna 21 is secured flush with the surface of backing member 19.

The shape and proportion of the radome 20 is dependent upon innumerable factors such as the size and type of the airplane, the size and character of the antenna 21, and the location of the radome on the aircraft. It is desirable to shape and proportion and to locate the radome 20 for minimizing drag and to alter the stability and control characteristics of the airplane to a minimum extent. In the preferred construction, the radome 20 is circular on disk shaped in plan view having convex upper and lower surfaces and a sharp, thin or rounded peripheral edge. As shown in FIGURE 2, the edge is covered by a conventional de-icing boot 23. Thus, as illustrated, the upper and lower surfaces of the radome 20 each may be hemispherical or paraboloidal. These surfaces joining at a rather sharp circular periphery 24, such a configuration being aerodynamically desirable.

It is a feature of the invention that a substantial or major portion of the radome be constructed of metal, for example, aluminum alloy, titanium, or the like, and internally reinforced as found necessary. Thus, there may be metal portions of the radome comprising upper and lower skins 25 and 26, supporting ribs 27, and the suitable internal trusses 28, diagonals etc.

As mentioned above, the radome also has a "window" portion constructed to be substantially transparent to the radar energy. This portion of the radome comprises upper and lower skins 30 and 31, constructed of fibre glass fabric impregnated with resin or plastic, internal parallel ribs 32, trusses 33, etc. of plastic or other dielectric materials. It should be observed that the metal portion of the radome 20 may be readily designed and constructed to have ample physical strength as in the window or transparent portion of the radome and may likewise be constructed and internally reinforced to be adequately strong as there are no parts or members moving or rotating within the radome to interfere with the installation of suitable structure. The skins 25, 26, 30 and 31 are joined one with the other, at appropriate joints to provide a weather-tight enclosure. A suitable anti-icing boot 23, or the equivalent, extends around the periphery 24 of the radome to prevent excessive ice formation or accumulation.

As shown in FIGURE 4, the radome 20 is supported at its upper end on the pylon 14 to rotate about a generally vertical axis. A tubular barrel or spindle 34 serves to carry the rotating radome. The spindle 34 is carried by and is affixed to a circular supporting member 35 which comprises, in general, a member 36 and a concave "dish-like" member 37 connected together by means of a plurality of supports 38 and having their peripheries joined to the structure of the pylon 14. The circular support member 35 is secured to and mounted on a supporting structure 39 which includes several uprights 40, a plurality of trusses 41 and braces 42. Supporting structure 39 is completely enclosed by pylon 14 aft of antenna 15 and is suitably connected to a pair of mounting rings 43 and 44 forming an integral part of the fuselage 10 of the airplane. These mounting rings are spaced apart in fixed relationship so that the base of the supporting structure 39 is wider than the attachment point of the supporting structure 39 to the circular supporting member 35. It is to be understood that the uprights, braces and trusses shown in FIGURE 4 are duplicated throughout the construction of the supporting structure 39 to form a frustro-pyramid configuration.

The opposing ends of spindle 34 are provided with annular bearings 45 and 46. The inner race of each bearing is secured to the spindle 34 whereas the outer race of bearings 45 and 46 is secured to and carried by a "box-like" structure 47 integrally formed in the radome 20 shown more clearly in FIGURES 3 and 5.

With reference to FIGURE 5, the spindle 34 is provided with a plurality of vertical stiffeners 48 carried on the outer periphery of the spindle in fixed space relationship and further is provided with a top member 50 which is similarly provided with a plurality of stiffeners 51. Top member 30 is employed to support a rotary coupling 52 which connects an input radar transmission line 53 to an output line 54 terminating in the antenna 21. It is to be understood that any suitable rotary coupling may be employed for coupling the fixed input line 53 to the rotating output line 54 and that this rotary coupling does not form a part of the present invention. However, for purposes of description rotary coupling 52 may be of a conventional commutator type and the lines 53 and 54 may be of the coaxial type.

Top plate 50 is also employed to carry and support a pair of hydraulic motors enclosed within a housing 55 which receive hydraulic actuating fluid from input sources 56 and 57. Projecting upward from housing 55 is a pinion gear 58 carried on the end of a shaft 60 rotatable in accordance with the driving hydraulic motors. Pinion gear 58 projects beyond the surface of top plate 50 and is in meshing engagement with an annular ring gear 61 supported on a channel shaped stiffening plate 62 which is secured to an intermediate structure 49.

The intermediate structure 49 as well as the outer races for the upper and lower bearings 45 and 46 are supported on the box-like structure 47 by means of coupling elements 65 and 66 and the upper skin 25 of the radome 20 per se.

During operation, the antenna 15 and radome 20 is rotated at a suitable rate, for example 6 revolutions per minute. The rotation of the radome is performed by the hydraulic motors enclosed within housing 55 which drives pinion 58 and thereby transfers rotary motion to the radome via member 62 and annular ring 61. The rotation of these members is transmitted via the box-like structure to the rest of the radome.

The antenna 21 is housed within the radome 20 to move or turn therewith and is located in position to "look through" or directly face the "window" portion of the radome. In accordance with the invention any selected or required antenna array may be employed. We have shown a simple, horizontally elongated flush foil type radiator or antenna 21 which is arranged substantially horizontal in the radome 20 to extend tangentially, or almost diametrically, therein, being arranged adjacent but at one side of the spindle 34. It is to be noted that the antenna faces and looks through the dielectric window portion of the radome and the strong metallic region of the radome is behind the antenna and may have skin parts, etc. extended above and below the antenna. The major portion of the coaxial cable or guide extends below the lower end of spindle 34 and rotary joint 52 and is stationary with the spindle 34. The upper portion of the rotary joint 52 and output coaxial cable or guide rotates with the radome.

It is to be noted that the radome upper and lower surfaces are rigidly attached to the center box-like structure 47. This structure rotates on the fixed spindle 34 by means of bearings 45 and 46. Bearing 45 is of smaller diameter than the bearing 46. Therefore, loads existing between the radome and the fixed pylon 14 are transmitted through both bearings. The upper bearing 45 resists vertical and horizontal loads, i.e. thrust and radial loads while the lower bearing 46 resists horizontal loads, i.e. radial loads only. Moment loads on the radome as well as drag and lateral loads are transferred through both bearings as radial loads. Vertical loads are transferred through the upper bearing as thrust loads.

While, as already described, the proportions of the radome 20 may vary greatly in different installations, it is of interest to note that where a radome of the present invention is installed on the type of airplane illustrated and in the general position illustrated, the radome may vary between 30 feet and 50 feet in diameter and from 5 feet to 12 feet in height or thickness. These dimensions are only given by way of explanation and are not intended as restrictions or limitations. It will be readily apparent that a radome of such proportions readily accommodates a large effective antenna array means.

As shown in FIGURE 4 and in the enlarged fragmentary view of FIGURE 6, the present invention further contemplates the employment of an aerodynamic seal 70 separating the fixed structure of the circular support member 35 and the lower portion of the radome. The lower portion of the radome is contoured slightly with an annular recess 59 to receive the fixed circular support member 35 so that support member 37 completes the configuration of the lower portion of the radome. Seal 70 acts as an aerodynamic pressure seal which prevents unwanted airflow and air pressures from accumulating between the uppermost portion of the pylon 14 and the rotating radome 20. Also, an annular nylon brush 71 is provided which prevents debris or other miscellaneous matter from entering the aerodynamic seal area and causing damage or other difficulties.

Having described only a typical form of the invention, I do not wish to be limited to the specific details herein set forth, but wish to reserve to myself any variations or modifications that may appear to those skilled in the art and which fall within the scope of the following claims.

I claim:

1. In an airplane, the combination of a disk-shaped radome rotatably mounted on and exterior to the body of said airplane with its minor axis generally perpendicular to the direction of flight, said disk-shaped radome having a major solid segmental portion, greater than one half thereof, constructed of high strength metal and a minor portion of said radome, less than one half thereof, constructed of material substantially transparent to high frequency energy, a spindle fixed to the body of the airplane and projecting a substantial distance into the interior of the radome substantially in the center thereof, bearing means rotatably securing the radome to the fixed spindle within the radome, means for rotating the radome about an axis normal to the direction of flight and an antenna mounted in said radome for rotation therewith, said antenna located in said minor portion of said radome beyond said spindle and arranged to transmit and receive through said minor portion.

2. A combination as in claim 1 wherein said disk-shaped radome has a circular peripheral edge and convex upper and lower surfaces.

3. A combination as in claim 1 and including a spindle receiving structure in said radome at the center thereof for receiving said spindle, said structure rigidly and reinforcingly connecting the upper and lower surfaces of said radome and having said bearing means mounted thereon.

4. A combination as in claim 1 wherein said bearing means includes bearings at at least two axially spaced positions on said spindle within said radome.

5. A combination as in claim 1 and including a streamlined pylon mounted on the body of said airplane fixedly supporting said spindle in spaced relation to the airplane body.

6. In an airplane having a fuselage, a streamlined pylon projecting from the upper side of the fuselage, a disk-shaped radome rotatably mounted at the upper end of said pylon and spaced above the fuselage with its minor axis generally perpendicular to the direction of flight, a spindle fixed to the pylon and extending into the interior of said radome substantially in the center thereof, bearing means rotatably securing the radome to said fixed spindle within the radome, means for rotating the radome about an axis normal to the direction of flight, a circular recess in the bottom of said radome concentric with its minor axis, a circular upper end portion on said pylon concentric with the minor axis of said radome and received in the circular recess of said radome to provide an aerodynamic seal between said pylon and said radome, an antenna in the radome rotatable therewith as a unit, a portion of said radome constructed of material substantially transparent to high frequency energy, said antenna being arranged to transmit and receive through said transparent portion.

7. A combination as in claim 6 and including a brush mounted in the space between the sides of said recess and the raised portion of said pylon to exclude debris from between said pylon and the recess in said radome.

References Cited in the file of this patent

UNITED STATES PATENTS

| | | |
|---|---|---|
| 2,607,009 | Affel | Aug. 12, 1952 |
| 2,623,999 | Kulikowski | Dec. 30, 1952 |
| 2,702,346 | Evans et al. | Feb. 15, 1955 |
| 2,814,038 | Miller | Nov. 19, 1957 |

FOREIGN PATENTS

| | | |
|---|---|---|
| 519,809 | Great Britain | Apr. 5, 1940 |

OTHER REFERENCES

IRE Convention Records, July 25, 1956, vol. 4, part 1, pages 236–241, particularly page 240, "Future Trends in Radomes for Ground Equipment," by Milton V. Ratynski.

Radar Scanners and Radomes by Cady et al., McGraw-Hill Book Co. Inc., page 440, Aug. 5, 1958.

Pub. III, Photo entitled "Piggy-back Flying Saucer Tested," The Washington Post and Times Herald, Friday, Aug. 10, 1956, page 16.

Pub. IV, "Radomes and Aircraft Design," Aeronautical Engineering Review, vol. 11, No. 5, May 1952, pages 69–81.